(12) United States Patent
Cittadini Bellini et al.

(10) Patent No.: US 9,669,580 B2
(45) Date of Patent: Jun. 6, 2017

(54) METHOD AND APPARATUS FOR HEATING HEAT-SHRINKABLE PIPE SLEEVES

(71) Applicant: SAIPEM S.P.A., Milanese (IT)

(72) Inventors: Serafino Cittadini Bellini, Ascoli Piceno (IT); Valerio Bregonzio, San Giuliano Milanese (IT)

(73) Assignee: SAIPEM S.P.A., Milanese (IT)

( * ) Notice: Subject to any disclaimer, the term of this patent is extended or adjusted under 35 U.S.C. 154(b) by 329 days.

(21) Appl. No.: 14/356,976

(22) PCT Filed: Nov. 8, 2012

(86) PCT No.: PCT/EP2012/072139
§ 371 (c)(1),
(2) Date: May 8, 2014

(87) PCT Pub. No.: WO2013/068460
PCT Pub. Date: May 16, 2013

(65) Prior Publication Data
US 2014/0305573 A1  Oct. 16, 2014

(30) Foreign Application Priority Data
Nov. 9, 2011 (GB) .................................. 1119345.5

(51) Int. Cl.
*B29C 65/10* (2006.01)
*B29C 63/00* (2006.01)
(Continued)

(52) U.S. Cl.
CPC .......... *B29C 65/10* (2013.01); *B29C 63/0069* (2013.01); *B29C 63/42* (2013.01); *F16L 13/0272* (2013.01); *F16L 58/181* (2013.01)

(58) Field of Classification Search
CPC .................................................... B29C 65/10
(Continued)

(56) References Cited

U.S. PATENT DOCUMENTS 3,481,805 A * 12/1969 Tavelle ................ B29B 13/024
156/294
3,675,905 A    7/1972 Placek
(Continued)

FOREIGN PATENT DOCUMENTS

AU         550137 B2    3/1986
CA       2 658 494 A1   9/2010
(Continued)

OTHER PUBLICATIONS

Search Report issued on Aug. 27, 2009, by the United Kingdom Patent Office in United Kingdom Patent Application No. GB0907859.3. (4 pages).
(Continued)

*Primary Examiner* — Jeff Aftergut
*Assistant Examiner* — Jaeyun Lee
(74) *Attorney, Agent, or Firm* — Buchanan Ingersoll & Rooney PC

(57) ABSTRACT

A heat-delivery apparatus (12) heats a heat-shrinkable sleeve (10) on a pipe (2). The heat-delivery apparatus (12) includes one or more heater elements (20) which define an interior heating surface that surrounds the sleeve (10). An air space is thus defined between the exterior of the sleeve (10) and the interior heating surface. The flow of air, that would otherwise be generated by the step of applying heat, within said air space is controlled or restricted for example by means of fins (50, 50*s*, 60) that control or restrict the airflow, fully or partially sealing the air space with one or more sealing members (70), or fans (80) that generate an opposing airflow (82).

22 Claims, 12 Drawing Sheets

(51) Int. Cl.
  *B29C 63/42* (2006.01)
  *F16L 58/18* (2006.01)
  *F16L 13/02* (2006.01)

(58) Field of Classification Search
  USPC .................................................. 156/499, 86
  See application file for complete search history.

(56) References Cited

U.S. PATENT DOCUMENTS

| | | | |
|---|---|---|---|
| 3,887,328 A | | 6/1975 | Maddock |
| 4,160,543 A | | 7/1979 | Dill et al. |
| 4,378,207 A | | 3/1983 | Smith |
| 4,460,820 A | | 7/1984 | Matsumoto et al. |
| 4,595,607 A | | 6/1986 | Betteridge et al. |
| 4,628,989 A | | 12/1986 | Parker et al. |
| 4,671,833 A | * | 6/1987 | Bradford ............. B29C 63/0069 156/86 |
| 4,673,122 A | | 6/1987 | Dubey |
| 4,749,843 A | | 6/1988 | Abramson |
| 4,979,314 A | * | 12/1990 | Fresnel ................. B65B 53/063 34/104 |
| 5,030,810 A | | 7/1991 | Haley et al. |
| 5,060,289 A | | 10/1991 | Abramson |
| 5,073,108 A | * | 12/1991 | Kirby .................... B29B 13/024 138/32 |
| 5,205,732 A | | 4/1993 | Kirby |
| 5,434,387 A | | 7/1995 | Haley |
| 7,247,584 B2 | | 7/2007 | Powell |
| 2012/0037297 A1 | | 2/2012 | Nardo |
| 2012/0090765 A1 | | 4/2012 | Tailor et al. |

FOREIGN PATENT DOCUMENTS

| | | |
|---|---|---|
| CN | 201056579 Y | 5/2008 |
| EP | 0 038 655 A2 | 10/1981 |
| EP | 0304333 A1 | 2/1989 |
| EP | 0 417 375 A1 | 3/1991 |
| GB | 2 076 489 A | 12/1981 |
| JP | 8-132449 A | 5/1996 |
| JP | 9-060788 A | 3/1997 |
| JP | 2006-194368 A | 7/2006 |
| RU | 2 215 797 C1 | 11/2003 |
| WO | 02/11972 A1 | 2/2002 |
| WO | 2010/102392 A1 | 9/2010 |
| WO | WO 2010/130345 A1 | 11/2010 |
| WO | 2013/067631 A1 | 5/2013 |

OTHER PUBLICATIONS

Search Report issued on Mar. 8, 2012, by the United Kingdom Patent Office in United Kingdom Patent Application No. GB1119345.5. (3 pages).

Office Action issued on Jan. 26, 2014, by the Algerian Patent Office in National Phase Application No. PCT/EP2010/002685. (1 page).

Office Action (Written Opinion) issued on Sep. 26, 2013, by the Eurasian Patent Office in Russian Patent Application No. 201101594/3, and an English translation of the Office Action. (4 pages).

Buchanan, "The World of Field-Applied Pipeline Coatings," Canusa-CPS, May 2011, pp. 21-22, 24, vol. 11, No. 5, Palladian Publications Ltd.

International Search Report (PCT/ISA/210) mailed on Feb. 11, 2013, by the European Patent Office as the International Searching Authority for International Application No. PCT/EP2012/072139.

Written Opinion (PCT/ISA/237) mailed on Feb. 11, 2013, by the European Patent Office as the International Searching Authority for International Application No. PCT/EP2012/072139.

\* cited by examiner

METHOD AND APPARATUS FOR HEATING HEAT-SHRINKABLE PIPE SLEEVES

BACKGROUND OF THE INVENTION

The present invention concerns an apparatus and method for heating a heat-shrinkable sleeve on a pipe. More particularly, but not exclusively, this invention concerns a method of applying a heat-shrinkable sleeve to a portion of a pipe and a heat-delivery apparatus for heating a heat-shrinkable sleeve around a portion of a pipe.

Pipelines for transportation of hydrocarbons, such as gas or oil pipelines, typically comprise sections of pipe welded together. Each section of pipe may include one or more outer coatings including for example one or more of a corrosion resistant coating, a plastic coating, and a concrete coating. To allow the ends of two sections of pipe to be welded together, the pipe coating at each end includes a cut-back, exposing the metal pipe ends to be welded together. The exposed pipe-ends once welded together may be protected by means of arranging a heat-shrinkable sleeve over them and then attaching the sleeve to the exposed pipe ends in the welded region by heat-shrinking the sleeve onto the pipe. The sleeve may be heat shrunk onto the pipe whilst the pipe is vertical (for example in a J-lay configuration) and/or generally horizontal (for example in an S-lay configuration).

WO 2010/130345 (Saipem SpA) discloses an apparatus for applying a heat-shrinkable sleeve to a portion of a pipe, the apparatus being in the form of a heater clamp that when closed has an inner surface of heater devices facing the pipe, the heater devices being arranged to define a generally cylindrical surface. In use, the heater devices may be operated to provide progressive and controlled heating of the sleeve. For example heating may start at a position that is in the middle of the sleeve in the axial direction and then subsequently proceed to heating at the axial ends of the sleeve. The embodiments illustrated and described in WO 2010/130345 concern a method of laying pipeline in S-lay mode.

The heating of the sleeve, which parts are heated when, and/or the relative orientation of the pipe causes movement of air in the gap between the pipe and the surfaces of the heater devices. For example, if a circumferentially extending heater apparatus were used to heat-shrink a sleeve onto a pipe in the J-lay configuration, hot air may rise up vertically through the gap between the heaters and the generally vertical pipe causing cooler air to be drawn into the gap at the lower end of the clamp apparatus. In the S-lay configuration, hot air may rise up vertically through the gap between the heaters and the generally horizontal pipe causing airflow currents in a direction circumferentially around the pipe, drawing cooler air into the gap at one or both ends of the clamp at the lowermost regions. In the S-lay configuration there may be a slight inclination in the pipe in which case, air may flow along the pipe in the general direction of inclination (from low to high). Heating in localised regions in the gap may generate convection driven airflows. Eddy currents may also be generated. It has been recognised by the inventors of the present invention that such airflows could be detrimental to the efficient heating of the heat-shrinkable sleeve and/or to how well the sleeve is secured/fixed to the pipe once the sleeve is shrunk onto the pipe.

The present invention seeks to mitigate the above-mentioned problems. Alternatively or additionally, the present invention seeks to provide an improved method of applying a heat-shrinkable sleeve to a portion of a pipe and/or an improved heat-delivery apparatus for heating a heat-shrinkable sleeve around a portion of a pipe.

SUMMARY OF THE INVENTION

The present invention provides a method of heating a heat-shrinkable sleeve around a portion of a pipe during a method of laying a pipeline. The method includes the following steps:
  providing a pipe,
  arranging a heat-shrinkable sleeve around a portion of the pipe,
  arranging a heat-delivery apparatus around the pipe in the region of the sleeve in a heating configuration, the heat-delivery apparatus preferably including one or more heater devices which define an interior heating surface that surrounds the heat-shrinkable sleeve, there being an air space defined between the exterior of the heat-shrinkable sleeve and the interior heating surface, and
  applying heat to the heat-shrinkable sleeve via the heater devices.

The method of the invention advantageously further includes a step of controlling the flow of air within said air space that would otherwise be generated by the step of applying heat. This is preferably achieved by means of at least one of (a) providing one or more flow restricting members and (b) actively generating an airflow.

Thus, by having a step of positively controlling the flow of air within said air space, and by means of recognising that such a step could and ideally should be performed, the flow of air that would otherwise exist within said air space that would be detrimental to thermal efficiency and/or the quality of the shrinking process can be reduced or eliminated.

The step of controlling the flow of air may be performed in any of several different ways. The step of controlling the flow of air may be in the form of restricting the flow of air within said air space that would otherwise be generated by the step of applying heat. Some ways of restricting/controlling the flow of air in the air space may complement each other. There may be a step of providing flow restricting members, which preferably divide the air space into separate regions between which the flow of air is restricted. One or more fins may be provided that in use restrict the flow of air from one region in the air space to a different region in the air space. Each fin may have a height that is greater than 50%, and more preferably more than 75%, of the distance from the base of the fin and the exterior of the heat shrinkable sleeve. Each fin may have a height that is greater than 90% of the distance from the base of the fin and the exterior of the heat shrinkable sleeve. In use, the fin may therefore be close to touching the sleeve, which may therefore enhance the restriction and control of airflow. In certain embodiments, it may be permissible for the fin to touch the sleeve in its unshrunk state. The separation between the fin and the unshrunk sleeve is preferably in the range of 0 mm to 10 mm inclusive. The base of the fin may conveniently be positioned at approximately the same distance away from the longitudinal axis (i.e. of the pipe and/or sleeve) as a point on the interior heating surface. The base of the fin may be set back from the interior heating surface relative to the longitudinal axis. The base of the fin may in certain embodiments be closer to the longitudinal axis than at least some parts of the interior heating surface. Preferably, the distance between the longitudinal axis and the closest point of a fin is less than the distance between the longitudinal axis and the closest point on the interior heating surface. Thus, for example, the fins may radially protrude at least partly into the airspace beyond the extent of the heating surface. Preferably, each fin has a shape such that the shortest distance between the shrunk sleeve and the fin is less than, and more preferably less than half of, the shortest distance between the shrunk sleeve and the interior heating surface. The distance between the closest part of the interior heating surface and the pipe (excluding the sleeve) may be greater than 50 mm, and is possibly greater than 75 mm. The distance between the closest part of the interior heating surface and the pipe may be less than 150 mm, and is possibly less than 120 mm. A typical distance between the interior heating surface and the pipe may be between 80 mm and 100 mm.

The fins do not need to be arranged in a symmetrical pattern, although such an arrangement may be convenient. The fins do not need to be evenly distributed in relation to the interior heating surface, but again such an arrangement may be convenient. There may be one or more fins that abut adjacent fins. There may be one or more fins that do not abut any adjacent fin.

There may be a step of sealing, or at least partially sealing, the ends of the heat-delivery apparatus thereby restricting the flow of air to and/or from the air space. The seal may extend to more than 50%, and more preferably more than 75%, of the distance from the base of the seal to the exterior of the heat shrinkable sleeve. The seal may extend radially to at least 90% of the distance from the base of the seal to the exterior of the heat shrinkable sleeve. The seal may be close to touching the sleeve, which may therefore enhance the restriction and control of air flowing to or from the air space.

There may be a step of generating an airflow, preferably in a manner that reduces the adverse affects of any airflow that would otherwise be generated by means of the step of applying heat. For example, the airflow generated may be in a direction that at least partially opposes the direction of airflow that would otherwise be generated by means of the step of applying heat. For example, there may be one or more fans provided in the air space that generate an opposing airflow. The fans may direct air generally downwards and/or along the pipe to counteract the convection currents that have a tendency to direct air generally upwards and/or along the pipe in the opposite direction. The fans may include one or more fans located towards an upper end of the sleeve (in the axial direction). Additionally or alternatively, the fans may include one or more fans located towards a lower end of the sleeve (in the axial direction). Additionally or alternatively, the fans may include one or more fans located in the region of the middle of the sleeve (in the axial direction). The step of generating an airflow preferably includes generating an airflow in a direction that has a downwards component. The direction of airflow generated by each fan may be adjustable. The direction of airflow generated by each fan may be fixed.

The step of applying heat may include applying heat to all regions of the heat-shrinkable sleeve without moving said one or more heater devices relative to the pipe.

The heat-delivery apparatus when arranged in a heating configuration around the pipe/sleeve is preferably such that the interior heating surface surrounds and envelops the heat-shrinkable sleeve. Preferably, the interior heating surface surrounds and envelopes the heat-shrinkable sleeve for substantially the entire length of the sleeve. The heat delivery apparatus and sleeve may be so shaped and arranged that in use the extreme ends of the sleeve are at or near the end of the envelope of the apparatus.

The step of applying heat to the heat-shrinkable sleeve may include controlling the one or more heater devices to deliver different regions of the sleeve with different amounts of heat. The heat may be applied such that at a given time a first region of the interior heating surface transmits more heat per unit time than a second region of the interior heating surface. Alternatively or additionally, heat may be delivered at different power levels (or different levels of power per unit area). The method may comprise applying more heat to the sleeve at a first circumferential position compared to a second circumferential position along at least the majority of the length of the sleeve. For example, the sleeve may include an area where the material forming the sleeve overlaps at a seam or joint that extends along the length (axial direction) of the sleeve.

There may be a time during the heating process during which the first region of the interior heating surface transmits less heat per unit time than a second region of the interior heating surface. There may for example be at least three heater devices arranged at different positions along the axis of the pipe, such that a first heater device is positioned closer to the centre of the sleeve, in the axial direction (i.e. along the length of the sleeve), than second and third heater devices, the second heater device is positioned in the region of a first end of the sleeve, and the third heater device is positioned in the region of a second end of the sleeve opposite to the first end. In such an arrangement, the method may include individually controlling each of the first, second and third heater devices to apply heat to the heat-shrinkable sleeve. For example, the heat generated by the first heater device during a heating time period may be both (i) less than the heat generated by the second heater device during the same heating time period and (ii) less than the heat generated by the third heater device during the same heating time period. The second heater device located at one end of the sleeve may represent one end of the apparatus, whilst the third heater device located at the other end of the sleeve may represent the opposite end of the apparatus.

Preferably the method is performed using between four and twenty, inclusive, heater devices arranged at different positions along the axis of the pipe. There may be between five and ten, inclusive, heater devices. In such a case, there will be one or more heater devices positioned between the above-mentioned first and second heater devices. Each heater device may, in its heating configuration extend circumferentially about the axis of the pipe/apparatus, for example, thus forming a ring-like structure.

In the method, the or each heater device may comprise one or more panel heaters. Each panel preferably has a flat heating face. The flat faces of the heater panels may be arranged circumferentially and symmetrically around the axis of apparatus to form the general shape of a regular polygon. Each panel may for example define one side of the polygon. In certain embodiments, each side of the polygon may be defined by a plurality of panels. The heat-delivery apparatus used in the method may include a heater-mounting structure associated with each heater panel. Each heater panel may include a power connector connected to a corresponding power connector of the heater-mounting structure. Each heating panel may be removably mounted on the heater-mounting structure. Thus, a defective heating panel may be quickly and easily replaced.

There may be provided an electronic control unit for controlling the one or more heater devices to deliver different regions of the sleeve with different amounts of heat. The one or more heater device may for example be arranged to be powered electrically under the control of the control unit.

In the case where there are more than one heater device, the heater devices may for example be arranged to be individually controllable by the control unit. Each heater device may comprise one or more infrared heaters. Each heater device may comprise one or more electric heaters. The method preferably includes driving each heater device with electric power which is then converted into heat and/or electromagnetic radiation, such that the sleeve is heated. If radiation, for example infrared radiation, is generated then such radiation will typically transfer heat to the sleeve by means of the sleeve absorbing the radiation. Each heater device may comprise one or more electrically powered infrared heaters.

The method may be performed as part of a method of laying a pipeline. The pipe may be laid using a J-lay method. The pipe may be laid using an S-lay method. Other lay methods may be used. The pipe onto which the sleeve is heat-shrunk may therefore be defined by part of a pipeline, for example the end of a pipeline. The method may be performed from a vessel and the pipeline may be laid at sea. The pipeline may in other embodiments be a cross-country pipeline. The method may include an initial step of forming the pipe by welding two pipe sections together. One of the pipe-sections may be defined by the end of a pipeline. The other of the pipe-sections may be defined by a new length of pipe to be added to the end of the pipeline. The new length of pipe may have a length of greater than 5 m, and may possibly be longer than 10 m. The pipe may be in the form of a metal pipe, for example a steel pipe, having a non-metallic coating and a cut-back region, onto which the sleeve is shrunk. The diameter of the pipe, for example in an uncoated region, may be between about 100 mm and about 1,500 mm. For example, the diameter of the pipe may be more than about 150 mm, and possibly greater than 400 mm. The non-metallic coating may be in the form of a corrosion-resistant coating that protects the metal pipe from corrosion. The pipe may additionally comprise a further non-metallic coating, being at least 50% denser than water, such as for example a concrete coating.

The heat-shrinkable sleeve may be made from an extruded cross-linked polyolefin sheet, for example polyethylene or polypropylene. The sleeve may include an applied adhesive. The adhesive may be different for different types of pipeline operating conditions. The method may include applying an epoxy primer on either the sleeve or on the pipe surface. The sleeve may have a length (along the axis of the sleeve/pipe) of greater than 100 mm, and possibly greater than 400 mm. The sleeve may be shorter than 1,000 mm. For a typical embodiment, the sleeve may have a length of between 500 mm and 750 mm.

According to a variation of the first aspect of the present invention there is also provided a method of heating a heat-shrinkable sleeve around a portion of a pipe, preferably during a method of laying a pipeline, wherein the method includes the following steps:

providing a pipe, arranging a heat-shrinkable sleeve around a portion of the pipe, arranging a heat-delivery apparatus around the pipe in the region of the sleeve in a heating configuration, the heat-delivery apparatus including one or more heater devices which define an interior heating surface that surrounds the heat-shrinkable sleeve, there being an air space defined between the exterior of the heat-shrinkable sleeve and the interior heating surface, applying heat to the heat-shrinkable sleeve via the heater devices, and providing a means, preferably within the airspace, that controls at least one of (i) airflows within the airspace, (ii) airflows to the airspace and (iii) airflows from the airspace.

Such means advantageously promotes better shrinking of the sleeve onto the pipe, for example by means of improving the efficiency and/or the quality of the shrinking of the sleeve onto the pipe. Preferably, the means for controlling the airflows controls all of (i) airflows within the airspace, (ii) airflows to the airspace and (iii) airflows from the airspace. The airflow control means may operate by blocking or restricting airflows. The means may operate by generating an airflow that reduces the effect of an opposing airflow. Preferably the means that controls airflows acts to reduce the flow of air within said air space that would otherwise be generated by the step of applying heat.

According to a second aspect of the invention there is also provided a heat-delivery apparatus, preferably arranged and configured so as to be suitable for use as the heat-delivery apparatus of the method of the invention as described and claimed herein, wherein the heat-delivery apparatus, in use, has an axis alignable to coincide with the longitudinal axis of the portion of the pipe, the heat-delivery apparatus includes one or more heater devices so arranged that, in use, an interior heating surface is defined that surrounds the pipe on which the heat-shrinkable sleeve is arranged, there being an air space defined between the exterior of the heat-shrinkable sleeve and the interior heating surface, and the heat-delivery apparatus includes means, for example one or more devices or apparatus, for controlling the flow of air within the air space during heating of the heat-shrinkable sleeve. The means for controlling the flow of air may be in the form of a means for restricting the flow of air. The means for controlling the flow of air may take any suitable form, a non-exhaustive selection of which are described below.

Said means for controlling the flow of air may comprise one or more airflow restrictors, for example in the form of one or more physical barriers. Said means for controlling the flow of air may comprise one or more fairings. Said means for controlling the flow of air may comprise one or more air diverters. Said means for controlling the flow of air may comprise one or more fins arranged to restrict the flow of air within the air space during heating of the heat-shrinkable sleeve. The fins may be in the form of any physical structure that reduces air vortexes or other undesirable airflows within the air space between the sleeve and the heating surface. Said one or more fins may comprise a meshed structure (for example like a net), a structure with apertures or indentations, and/or may be substantially solid and without any passage for air to pass therethrough. In the case where the fin has one or more voids, apertures, or indentations or the like, then such voids, apertures, or indentations or the like may have any convenient shape such as a circle, square, parallelepiped, triangle, or polygon. The fin may have a generally thin and laminar-like shape, but also being shaped to have sufficient structural strength and robustness to withstand the loads that would typically be sustained in the field. The fins may be of metal.

At least one of the fins may have a length that extends in a generally axial direction. Such an arrangement may be of particular application when the pipe axis is in a generally horizontal or close to horizontal orientation, such as in an S-lay procedure.

At least one of the fins may have a length that extends in a generally circumferential direction. Such an arrangement may be of particular application when the pipe axis is in a generally vertical or close to vertical orientation, such as in a J-lay procedure.

The or each of the fins may have a height that extends to a radial position that is more than 50 mm closer to the longitudinal axis of the pipe than the closest part of the interior heating surface.

Preferably, the fins have a shape, configuration or structure that has a low impact on the efficiency of transmission of heat from the heating surface. For example, the fins preferably present substantially no obstruction to transmission of heat radiation from the heating surface to the sleeve. The fins may be substantially transparent to infra-red radiation. The fins may be reflective or semi-reflective to infra-red radiation. The fins are of course conveniently sufficiently heat resistant that they can withstand the temperature conditions that are sustained within the airspace in the heat-delivery apparatus.

The or each fin may be in the form of a wall. For example, the fin may have a planar and continuous structure, preferably with a substantially uniform thickness. At least one of the fins may include one or more kinks or bends. At least one of the fins may have an undulating shape and/or be corrugated and may for example have a zig-zagging shape.

The or each fin may extend inwardly (towards the longitudinal axis, when the heat delivery apparatus is in the closed position around a pipe) to nearly touch the pipe. The or each fin may in certain embodiments extend only just closer to the pipe than the heating surface.

The interior heating surface may be defined by a multiplicity of individual heater elements. In such a case, two or more fins may each be positioned between a respective pair of adjacent heater elements.

One or more sealing members may be provided to seal off the ends of the heat-delivery apparatus thereby restricting the flow of air. For example, a first sealing flange may be provided at a first end of the interior heating surface. A second sealing flange may be provided at a second, opposite, end of the interior heating surface. The first and second sealing flanges may thereby act to restrict the flow of air to and/or from the air space between the exterior of the heat-shrinkable sleeve and the interior heating surface.

In certain embodiments, there may be one or more sealing members and one or more fins. The provision of one or more sealing members may allow fewer fins to be included for the same beneficial effect.

One or more airflow generators may be arranged to provide an airflow within the air space, for example to act against any airflows that may otherwise arise from heating of the heat shrinkable sleeve. The one or more airflow generators may be located within the air space. The one or more airflow generators may comprise one or more fans.

There may be provided a controller (for example an electronic control unit) for controlling the heating effected by the one or more heater devices of the heat-delivery apparatus. The controller may for example control the duration, timing and/or power of operation of one or more of the heater devices during operation of the heat-delivery apparatus. There may for example be different regions of the sleeve that, within the period of operation of the heat-delivery apparatus, are heated in a different manner.

The heat-delivery apparatus may be arranged for movement between an open position and a closed position, such that in the open position, the heat-delivery apparatus defines a pipe entry region to allow passage of a pipe into or out of the heat-delivery apparatus, and in the closed position, the pipe entry region is closed. In the closed position, the interior heating surface is preferably arranged circumferentially and symmetrically around the axis of the apparatus ready to supply heat evenly to a pipe (or sleeve on such a pipe) located in the apparatus.

The heat-delivery apparatus may have at least two portions connected to each other by a hinge mechanism that allows rotation of one portion of the apparatus relative to another portion of the apparatus about an axis. The axis of rotation is conveniently substantially parallel to the longitudinal axis of the apparatus. The heat-delivery apparatus may be so arranged that the movement between its open and closed positions is performed by means of a clamping movement. It will be understood that the heat-delivery apparatus need not physically clamp the pipe during use, but that the movement of the heat-delivery apparatus may be similar to that of a clamp. The heat-delivery apparatus may be in the general shape of a clam shell device, in that it resembles two halves of a hollow cylinder being hinged relative to each other at the junction between the longitudinal edges of the two halves.

The heat-delivery apparatus may be mounted for movement towards and away from a pipe, for example by means of movement in a direction substantially along a radius of the pipe. The apparatus may be configured to move towards the pipe in an open position, and then, when the apparatus has accommodated the pipe, to close around the pipe. The heat-delivery apparatus may further include a centering mechanism to facilitate, in use, alignment of the axis of the apparatus with the axis of a longitudinal axis of the portion of the pipe. The heat-delivery apparatus may be so configured as to maintain, in use, heating elements of the one or more heater devices in spaced-apart relation with the heat-shrinkable sleeve around a pipe. For example, the distance between the exterior of the (uncoated) pipe at its narrowest diameter and the nearest point on an active heating part of a heating element may be between 20 mm and 300 mm. The distance may be between 50 mm and 150 mm. The centering mechanism may include legs, for example including feeler elements or pads, that contact the pipe to allow the apparatus to centre correctly on the pipe. The centering mechanism may additionally, or alternatively, include a light emitter for illuminating a part of the pipe. Two or more light emitters may each illuminate a point on the pipe, such that inspection of the points illuminated assist in the alignment of the apparatus relative to the pipe. In such a case, the centering mechanism may additionally include a light sensor for detecting light from the light emitter reflected by the pipe.

The heat-delivery apparatus may be configured to perform the method of the present invention. The heat-delivery apparatus may have an axis that, in use, is arranged to coincide with the longitudinal axis of the portion of the pipe. The apparatus may include a frame arranged to support the one or more heater devices. Several features concerning such a frame (and also heater devices similar to those of the present invention) are described and claimed in our PCT patent application entitled "Apparatus and Method for Heating Heat-Shrinkable Pipe Sleeves" published under number WO 2010/130345. The contents of that application are fully incorporated herein by reference. The claims of the present application may incorporate any of the features disclosed in that patent application. In particular, the claims of the present application may be amended to include features relating to the individual control and/or arrangement of the heater devices, the arrangement and/or configuration of the frame, and/or how and when heat is applied to the heat-shrinkable sleeve.

The axis of the apparatus, for the avoidance of doubt, will in most typical embodiments be in form of a straight line. The axis is a notional line, and may simply be defined by the notional line which coincides with the centre of each set of circumferentially arranged heater elements which define each heater device (when in the operational/heating configuration). Parts of a long pipeline may include significant curvature such that the axis of the pipeline may not be readily defined by a straight line. It will however be understood that in the context of the present invention the curvature, if any, in the region of the portion of the pipe around which the heat-shrinkable sleeve is arranged, will be normally be negligible, such that a straight line axis is readily defined.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
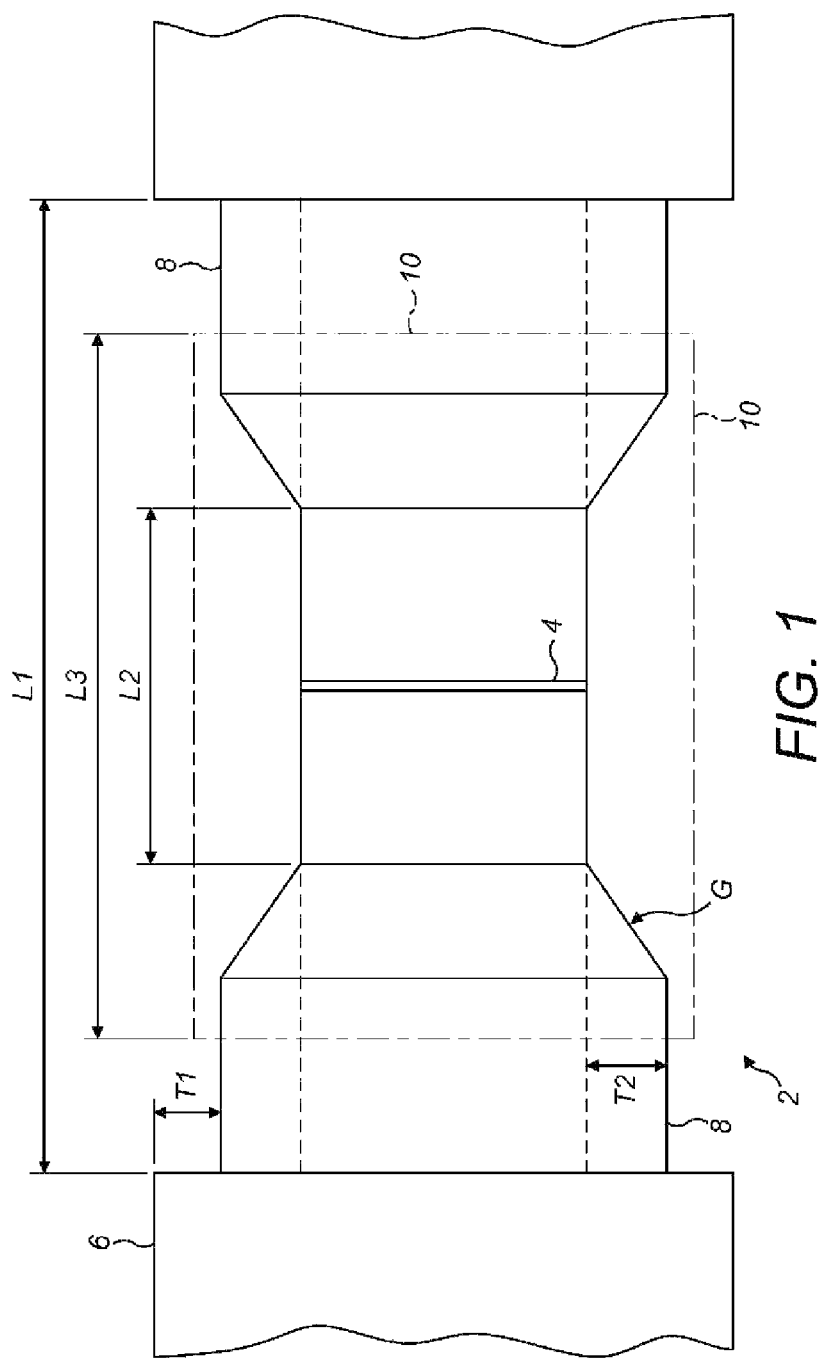
FIG. 1 is a schematic cross-sectional view of a joint in a pipeline showing a field joint coating and cut-back region.

By way of background, FIG. 1 shows in cross-section a schematic view of a coated pipeline 2 in the region of a welded joint 4. The pipeline is coated with concrete 6 along its length, but in the region of the joint 4 there is a cut-away portion of a length L1 of about 750 mm where the concrete is absent. The concrete coating 6 has a thickness T1 of about 40 mm. The pipe, being of steel, has a corrosion resistant plastic coating 8 having a thickness T2 of about 2.5 mm. This coating 8 is also cut away to reveal a bare field joint having a length L2 of about 350 mm, in which the uncoated steel pipe is exposed. The external diameter of the uncoated (bare) pipe is about 450 mm. The length of the pipe section being added to the pipeline is about 12 m (40 feet). The plastic pipe coating 8 gradually reduces in thickness from 2.5 mm to 0 mm by means of a gradient G of about 15 to 20 degrees (the scale in FIG. 1 is exaggerated for the sake of illustrating the geometry of the component parts of the pipe in the region of the joint 4). The plastic coating 8 and concrete coating 6 need to be absent in the region of the field joint so that the pipe ends can be welded together at the weld joint 4.

In order to protect the pipe 2 after the weld has been produced, a heat shrinkable sleeve (not shown in FIG. 1) is applied and shrunk onto the bare pipe so that the bare steel is covered either by the heat shrinkable sleeve or the plastic pipe coating 8. The region encompassed by the heat shrinkable sleeve, which typically has a length, L3, of about 550 mm, is designated in FIG. 1 by the box 10 drawn with a broken line. The sleeve may have a mean diameter, in its unshrunk state, of about 10 mm-15 mm greater than the pipe diameter.

Figure 2:
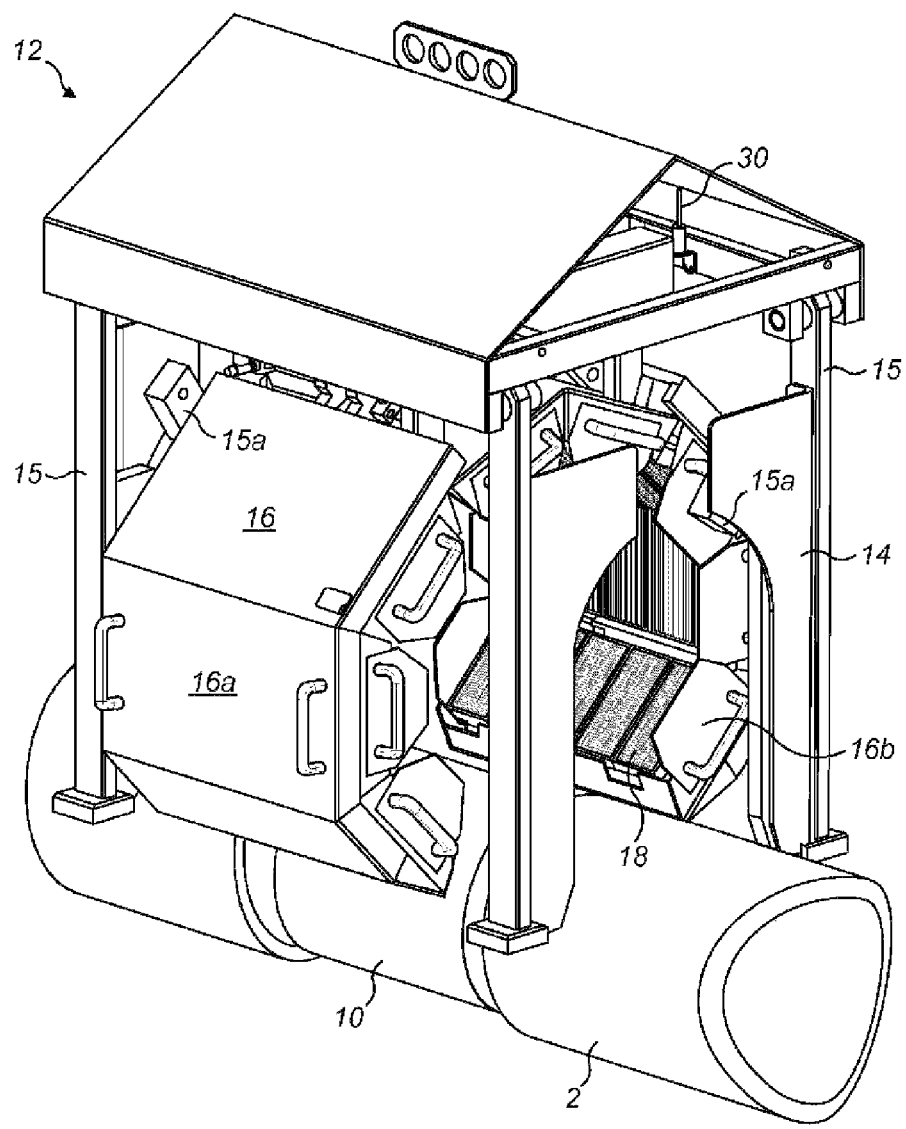
FIGS. 2 and 3 are perspective views of a heat delivery apparatus according to a first embodiment of the invention, the apparatus including a frame structure.
Figure 3:
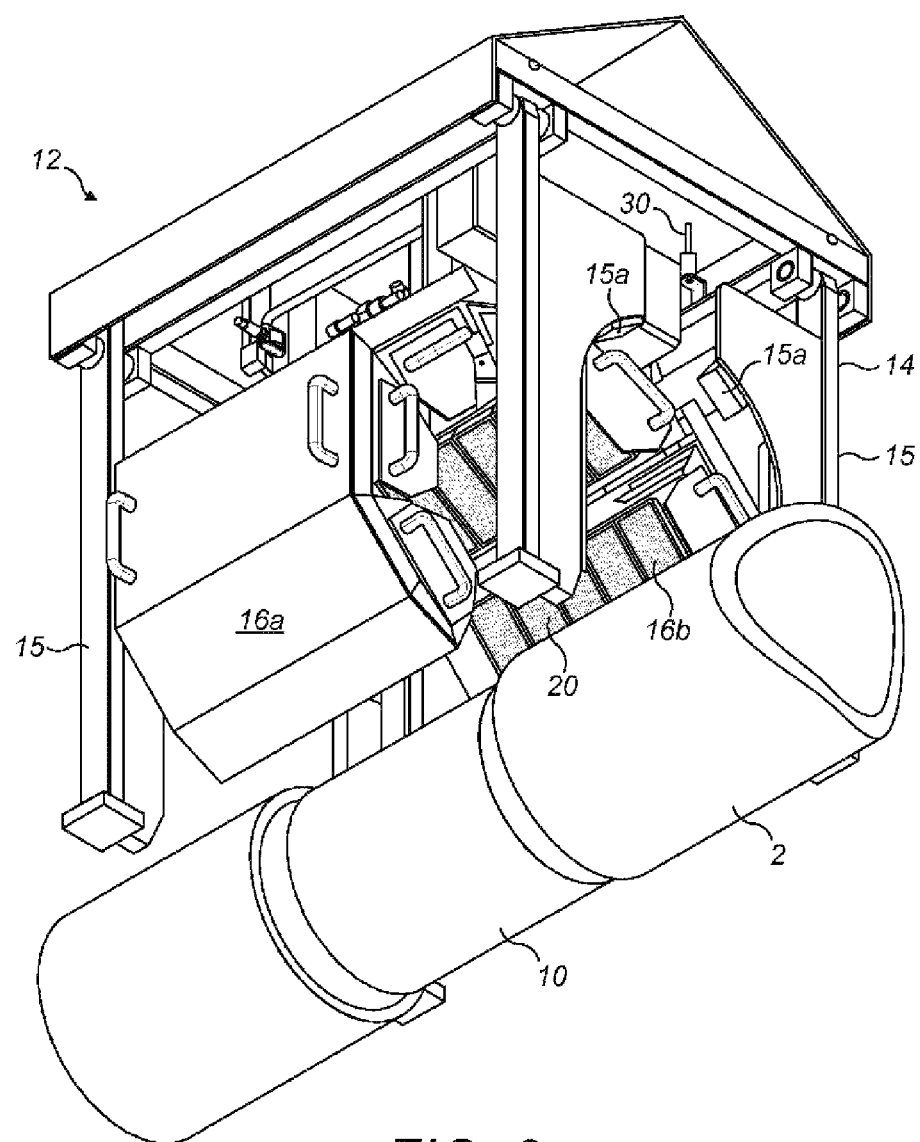
Figure 4:
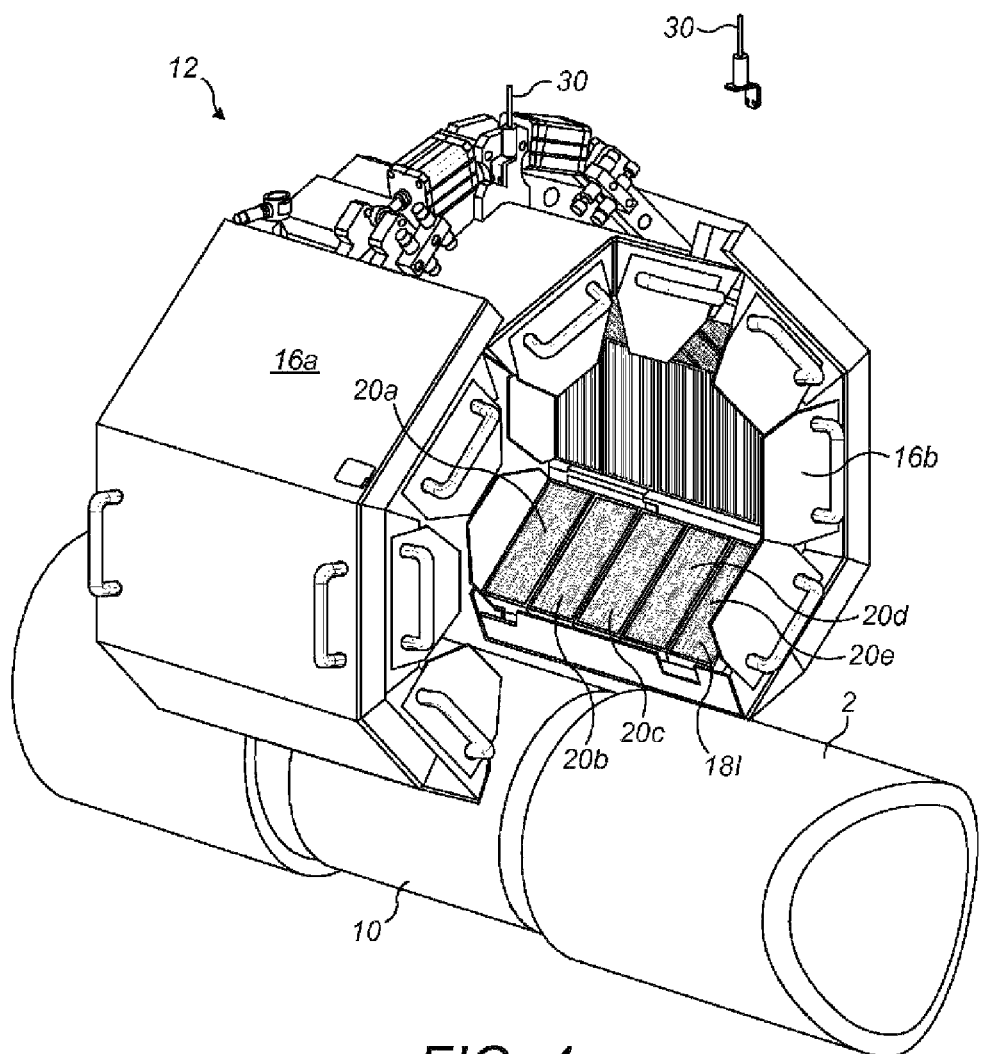
FIG. 4 is a partial view of the apparatus of FIGS. 2 and 3, with the frame structure removed for the sake of clarity.
Figure 5:
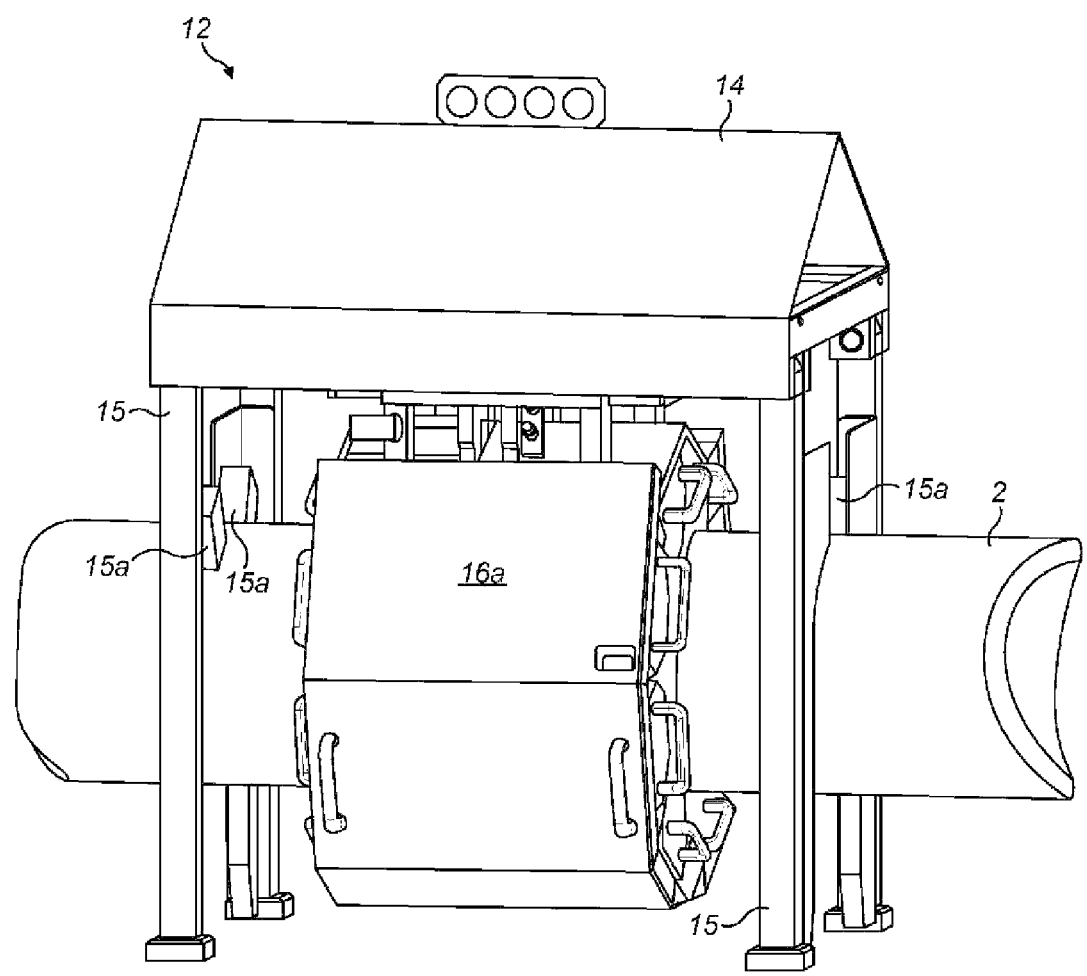
FIG. 5 shows the apparatus of FIGS. 2 and 3 heating a heat-shrinkable sleeve on a pipeline.
Figure 6:
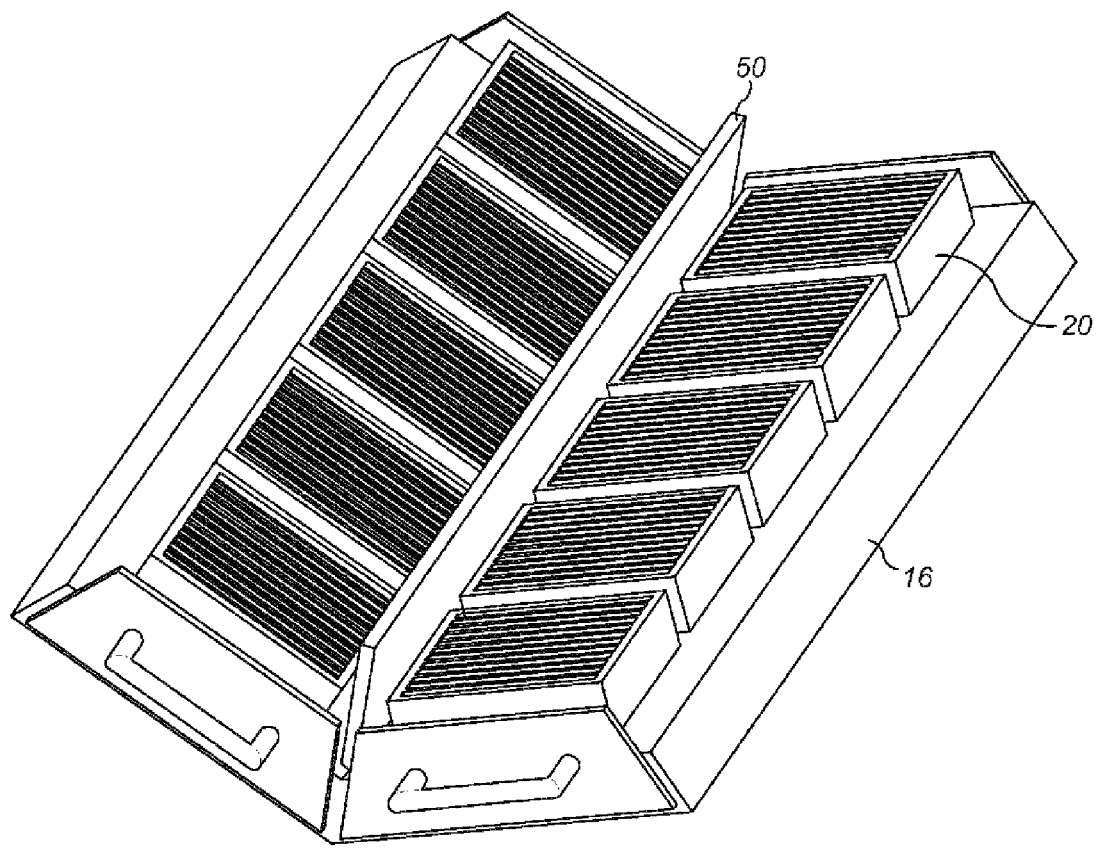
FIGS. 6 and 7 show an airflow restricting means on the heat delivery apparatus of the first embodiment (for S-lay)
Figure 7:
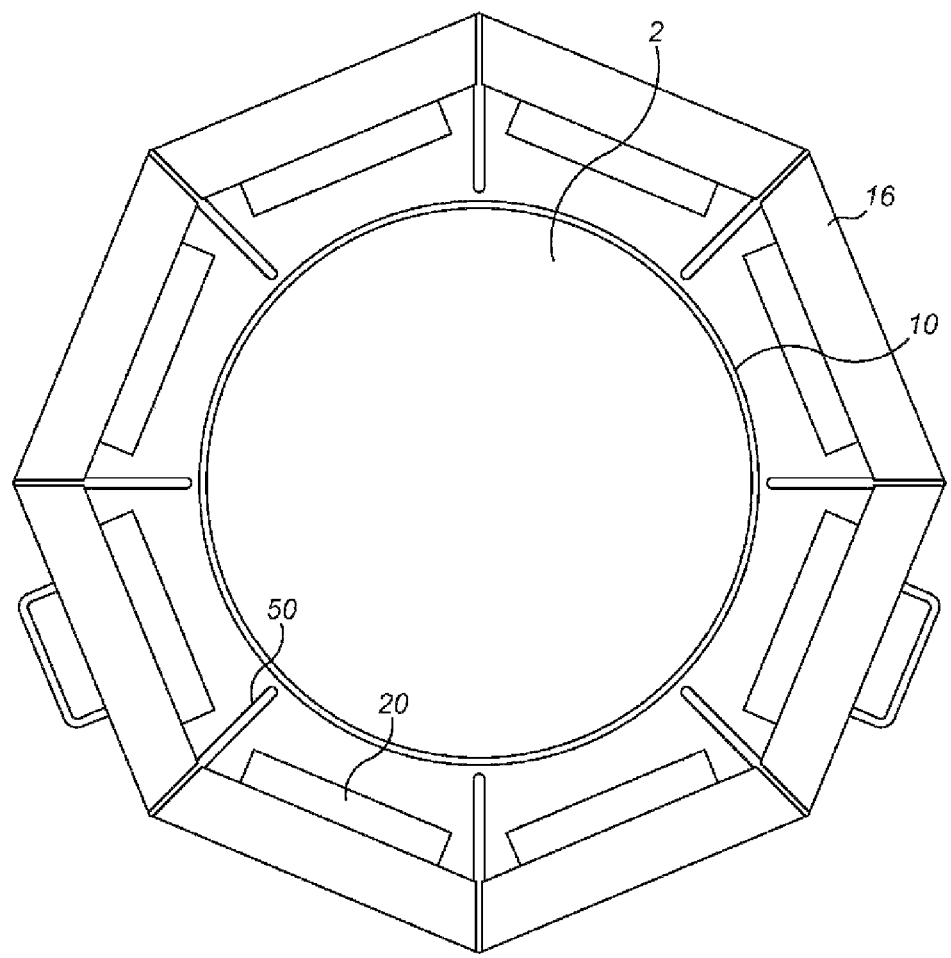

The first embodiment of the invention concerns a method and apparatus for heating a heat shrinkable sleeve onto a field joint by means of a heat delivery apparatus generally of the type shown in FIGS. 2, 3 and 4. The pipeline is laid from a pipe-laying barge operating in an S-lay mode. FIGS. 5 to 7 also relate to this first embodiment.

FIGS. 2 and 3 show the heat delivery apparatus 12 in an open configuration in which the apparatus may be moved into position around a pipe 2. The apparatus 12 includes a frame 14 (shown in FIGS. 2 and 3, but omitted from FIG. 4 for the sake of clarity) and two semi-toroidal heater arrays 16a, 16b. The frame includes four legs 15, which in certain applications may be lowered so that the feet of the legs 15 rest on a surface (such as a working platform). The frame 14 acts to support the arrays 16 of heaters in position relative to each other. Each array 16 of heaters includes four flat rows 18 of heater panels, each row 18 comprising five independently controlled heating elements 20 (controlled by a control unit). Thus, as shown in FIG. 4 the lower most heating panel row 181 of the right hand array 16b includes five rectangular heating elements 20a to 20e arranged sequentially along the axis of the apparatus 12 (the axis of the apparatus 12 in FIG. 4 being parallel to but spaced apart from the axis of the pipe 2). The heater arrays 16a 16b also include airflow restricting members in the form of longitudinally extending fins. The fins are not shown in FIGS. 2 to 5 but are described in further detail below with reference to FIGS. 6 and 7.

In use, the heater arrays 16a, 16b are closed around the pipe 2 to form a toroidal shape, so that a tunnel of heater elements 20 is formed, thereby defining an interior heating surface. When in the closed position the heater arrays 16 effectively comprises forty heater elements 20, disposed in five octagonal rings arranged along the length of, and concentric with, the pipe 2. It will be seen that each of the heater panel rows 18 has a substantially flat heating surface. There is a gap, or an air space, between the interior heating surface defined by the heater elements 20 and the exterior of the sleeve 10, and therefore also the pipe 2. The heater elements are each independently controlled, thus allowing one ring of heater elements to provide heat at different times and/or at different powers from another ring of heater elements at a different position along the length of the pipe. Each ring may be considered as heating a different zone along the length of the sleeve. If the sleeve includes a seam overlap area, a line of heater elements positioned immediately opposite the longitudinally extending overlap area may be required to provide more heat than, say, other heater elements at a different circumferential position around the pipe.

A control unit (not shown in the Figs) is connected to the pyrometers (also not shown), to receive temperature measurements. The control unit is also connected to control operation of each of the heating elements.

The apparatus has a hinge mechanism, which allows the apparatus to be moved from an open position as shown for example in FIG. 2 to a closed position, as shown for example in FIG. 5. Pneumatic cylinders (not shown) are provided to actuate the hinge mechanism, thereby effecting movement of the apparatus between the open and closed positions.

The heater arrays 16 are also mounted for movement towards and away from the pipe, in the vertical direction in the orientation shown in FIG. 5 (i.e. along a radial direction, with reference to the pipe). The frame 14 moves with the heater arrays 16 when the apparatus 12 moves towards and away from the pipe.

The apparatus 12 includes a centering mechanism that assists alignment of the apparatus 12 with a pipe 2. With reference to FIGS. 3 and 4, the frame 14 includes laser pointers 30, with associated light sensors (not shown), for ensuring that the heater arrays 16 are correctly aligned with, and concentric with, the pipe 2 (at least to within a tolerance of say +/−10 mm). With reference to FIG. 3, the centering mechanism frame also includes centering pads 15a, mounted on the legs 15, to assist in the centering of the apparatus 12 in relation to the pipe 2.

As shown in FIGS. 6 and 7, the heater arrays 16 (only part of one of which being shown in FIG. 6—i.e. showing two panel rows only of the four on an array 16) also include eight fins 50 which extend along the longitudinal length of the apparatus. The length of each fin 50 extends in an axial direction (parallel to the axis of the pipe, the position of which being very generally represented by reference number 2 in FIG. 7). There is a fin 50 between each pair of heater panel rows 18 (each panel row comprising five heater elements 20 arranged in series along the length of the apparatus, there being eight rows of panels arranged circumferentially around the pipes). FIG. 7 shows the fins 50 in their positions when the heat delivery apparatus 12 is in its closed configuration. The fins 50 have a height such that they extend away from the heater elements 20 up to, and close to touching, the exterior of the unshrunk sleeve 10 (leaving a gap of 10 mm or less between the ends of the fins and the sleeve). By comparison, the distance between the pipe exterior and the closest part of the heater elements is about 100 mm. The fins are each made of solid steel and have a thickness of about 1 mm. In use, the fins reduce the flow of air circumferentially around the pipe.

Heat shrinking of a sleeve onto a field joint of a pipe being laid in an S-lay mode and according to a method of the first embodiment of the invention will now be described. The general principles of operation of the heat delivery apparatus 12 of the first embodiment are substantially as set forth in WO 2010/130345, the contents of which application are fully incorporated herein by reference. The key aspects of the method of shrinking a sleeve onto the pipe according to the embodiments of the present invention, particularly those not described in WO 2010/130345, will therefore now be described.

With reference to FIG. 1, a weld 4 is first formed between one end of a pipeline and a new section of pipe (as described in WO 2010/130345). Next a FBE (Fusion Bonded Epoxy) primer is applied to the bare pipe. Then the sleeve 10, including an intermediate adhesive back coating (of a hard semi-crystalline hot melt adhesive), is assembled over the pipe 2 and the weld joint 4. The sleeve 10 is initially in the form of a rectangular double-layer (the sheet plus the layer of adhesive) piece of material, which is wrapped around the pipe so that two opposite ends of the material meet. The two ends are welded together in a known manner by means of a sleeve welder to form the tubular sleeve 10.

The heat delivery apparatus 12 is then moved towards the axis of the pipe with the heater arrays 16a, 16b in their open configuration (see FIGS. 2, 3, and 4). The centering pads 15a and the laser guides 30 are used to correctly align the apparatus 12 with the pipe 2. The heater arrays 16 are then moved from the open position to the closed position, such that the heater elements 20 are arranged concentrically around, and in symmetrical alignment, with the pipe (as shown in FIG. 5).

The heater elements 20 are then operated under the control of the control unit which receives measures of the temperature of the sleeve at various locations as sensed by the pyrometers. Infra-red radiation is delivered to the heat shrinkable sleeve initially from the centre of the sleeve and then after a time delay towards its periphery. Further details concerning the timing and control of the heaters is provided in WO 2010/130345 and so is not described in further detail here.

In the absence of the fins 50, convection currents caused by such heating would cause airflows in the air space between the heater elements 20 and the pipe exterior that could disrupt the even heating and therefore even shrinking of the sleeve 10. Also, such airflows, if allowed to exist, could cause cold air could be drawn into regions being heated therefore affecting efficiency and/or even heating. The fins 50 act as airflow restricting portions which reduce the amount of air flowing from one side of the fin to the other. Thus, airflows around the pipe are reduced. Reducing such convection currents thus assists in the efficient and even heating of the sleeve. The fins 50 also effectively divide the air space into separate regions between which the flow of air is restricted.

The sleeve 10 is then allowed to cool, whilst the apparatus 12 is opened and subsequently retracted.

Figure 8:
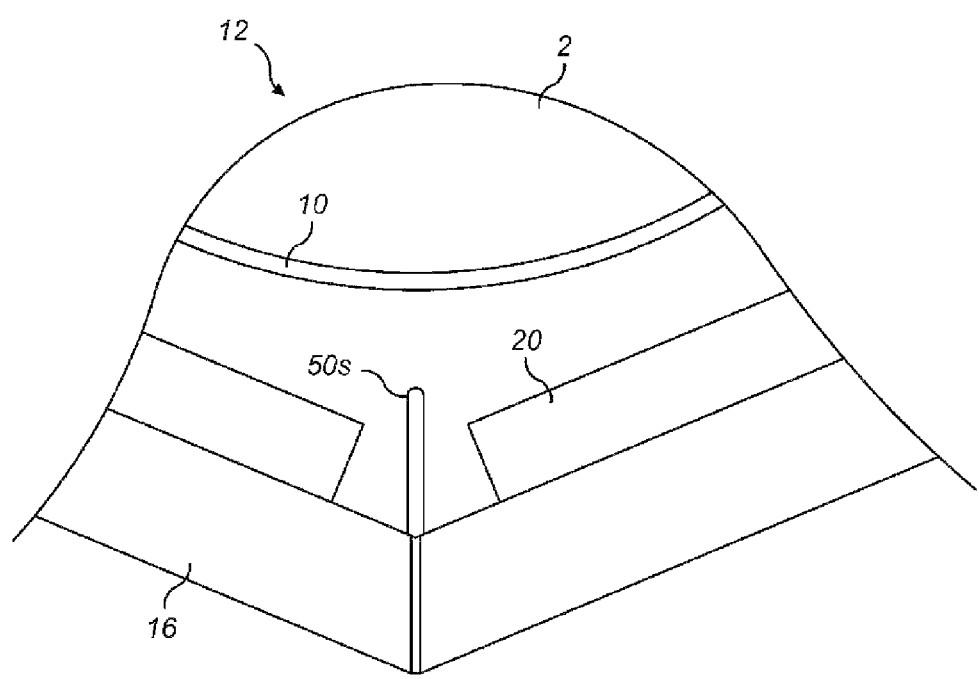
FIG. 8 shows a cross-section of a portion of a heat delivery apparatus according to a second embodiment of the invention.

A second embodiment of the present invention is shown in FIG. 8, which shows a heat delivery apparatus 12 similar to, but differing from, the apparatus of the first embodiment. The principal difference in this second embodiment is that the fins have a height that does not extend as close to the exterior of the sleeve. Thus, in the apparatus shown in FIG. 8, there is a gap between the top of the short fin 50s and the sleeve 10 that is less than (but only just less than) the closest separation between the heater element 20 and the sleeve 10. However, the presence of such a fin 50s may still reduce the airflows that might otherwise arise around the circumference of the pipe 2. Having a low profile fin 50s (or short fin 50s) may allow the apparatus to be used with a wider variety of pipe diameters. It will be seen however that the separation between the closest points on diametrically opposing fins is less than the separation between diametrically opposing points on the interior heating surface.

Figure 9:
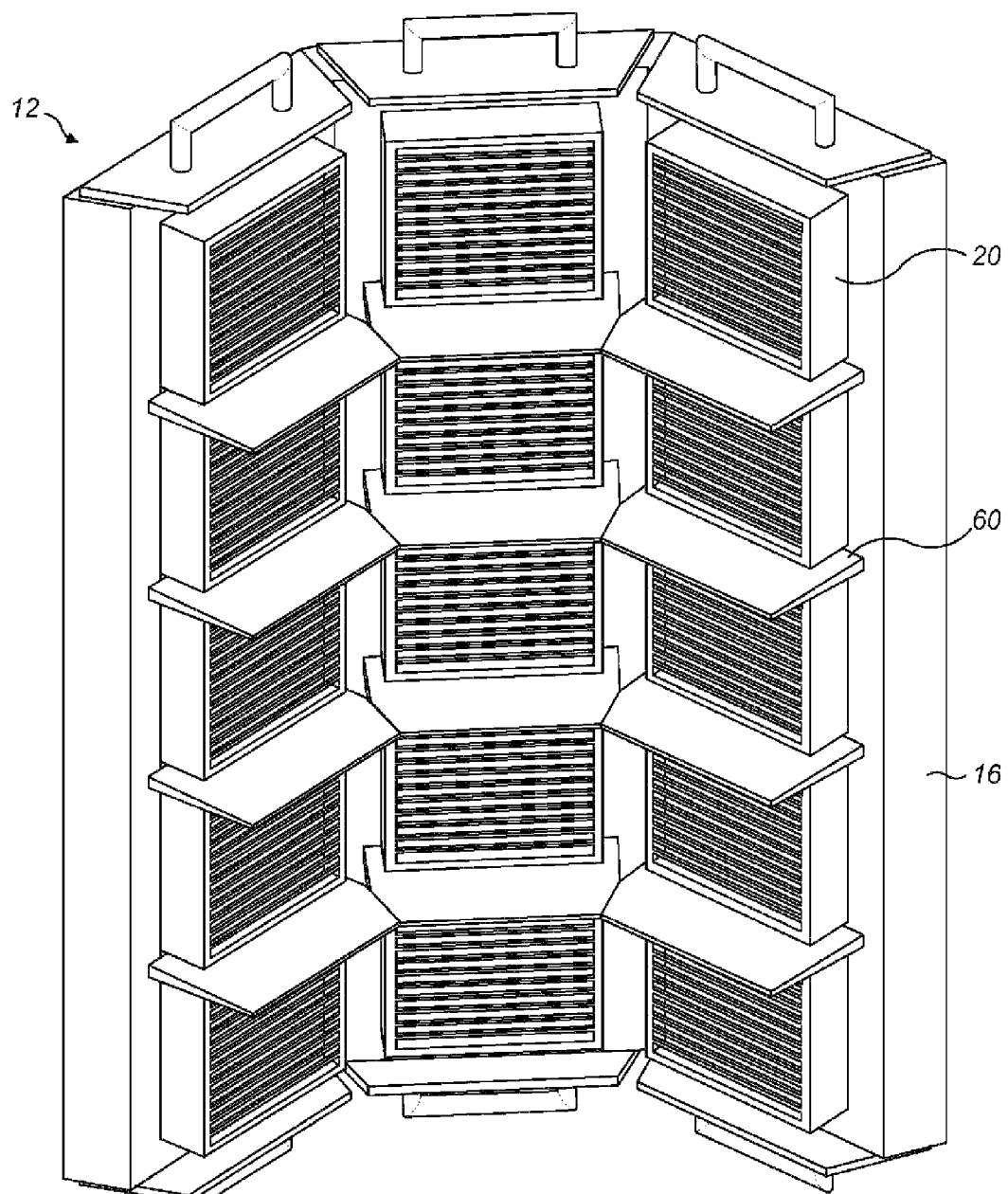
FIGS. 9 and 10 show a heat delivery apparatus and an airflow restricting means of a third embodiment (for J-lay)
Figure 10:
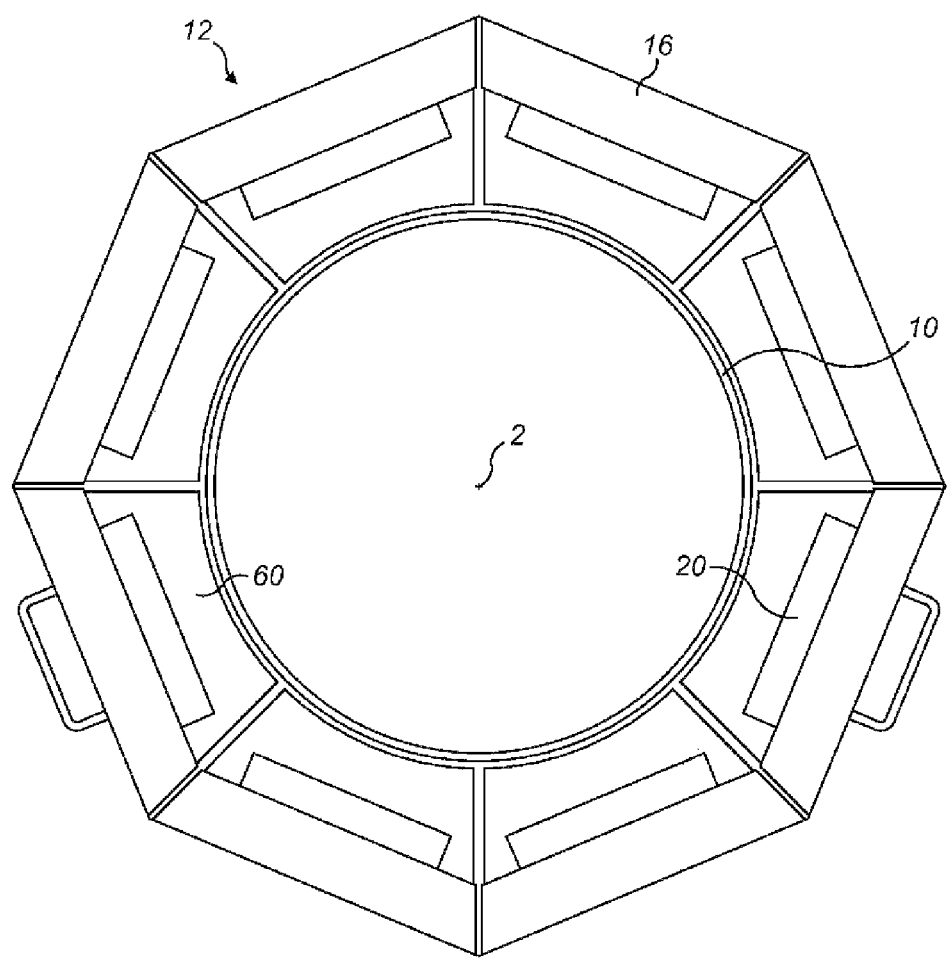

FIGS. 9 and 10 illustrate an apparatus 12 in accordance with a third embodiment of the invention, suitable for use in a method of J-laying a pipeline. Thus, in this embodiment, the pipe 2 and sleeve 10 are arranged with their respective axes being substantially vertical; in some implementations of this embodiment the angle of the axes may be at an inclination of about 15 degrees to the vertical, sometimes more and sometimes less. It should be noted that in FIG. 9, the pipe 2 and sleeve 10 are not separately indicated and that in FIG. 10 the sleeve 10 is shown but the pipe 2 is not, although the approximate location of the central axis of the pipe is indicated by the reference numeral 2. The frame (not shown) carrying the heat delivery apparatus 12 has a different configuration from that shown in relation to the first embodiment to facilitate operation of the apparatus in this vertical orientation. It will be seen that FIG. 9 is a partial view and shows three only of the four panel rows of the array 16. FIG. 10 is a cross-sectional view of the two arrays 16 in their closed position.

In this third embodiment, the fins 60 extend circumferentially around the axis of the apparatus, such that a circle of fins 60 separates each successive ring of heater elements 20 from its neighbouring ring(s) of heater elements. Each fin 60 has an upper surface (that surface which is closest to the exterior of the pipe 2) that is arcuate in shape. The fin 60 is shaped such that on average the separation between the surface which is closest to the exterior of the pipe 2 and the exterior of the unshrunk sleeve 10 is about 10 mm or less. With the pipe arranged substantially vertically, the heating of the sleeve could, without the presence of the fins 60, cause the onset of a so-called "chimney effect". This effect occurs when the air at the bottom of the sleeve 10 heats up and therefore rises, such that air starts flowing up towards the upper end of the pipe 2 thereby causing air vortexes that cool the bottom of the sleeve and disrupt the even and efficient shrinking of the sleeve 10. The presence of the fins 60 according to this embodiment of the invention however restricts and/or prevents air flowing upwards through gap between the pipe 2 and the heater elements 20.

Figure 11:
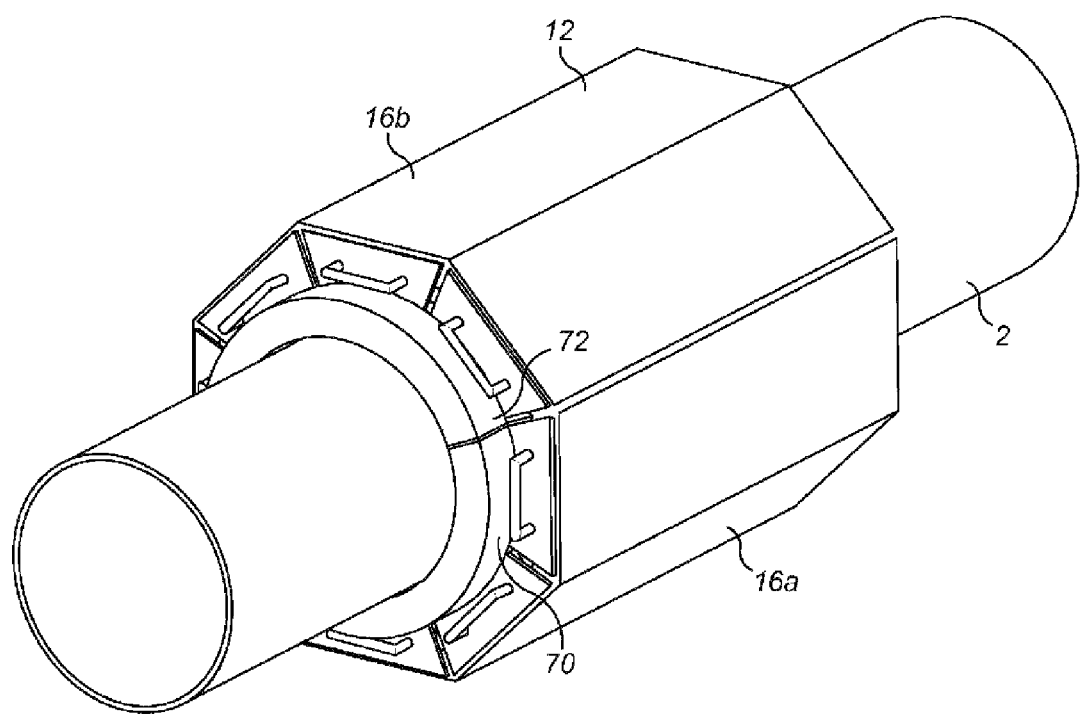
FIG. 11 shows a heat delivery apparatus and an airflow restricting means of a fourth embodiment (for either J-lay or S-lay)

FIG. 11 shows a fourth embodiment which restricts the flow of air within the air space between the pipe 2 and the heater elements 20 by means of sealing the ends of the heat delivery apparatus 12 to restrict ingress and egress of air. As shown in FIG. 11, sealing elements 70 are provided at each end of the heat delivery apparatus 12. Each sealing element 70 substantially blocks the gap that would otherwise exist between the ends of the heat delivery apparatus 12 and the exterior of the pipe. Thus, the flow of cool air from outside the heat delivery apparatus 12 into the air space between the pipe 2 and the heater elements 20 is restricted. The sealing elements 70 at each end are provided in two halves, one half being associated with one heater array 16a and the other half being associated with the other heater array 16b. The join 72 between the two sealing elements 70 is shown in FIG. 11. Alternatively, the sealing elements could be provided as two rings that are positioned over the pipe before the apparatus 12 is closed and then, after the apparatus is closed, are slid into place at each end of the apparatus 12. The sealing elements are made of a heat resistant material, but need not be metal and need not have such a high resistance to heat as the fins of the first to third embodiments, because the sealing members need not be as close to the heater elements. For example, the sealing elements may comprise polymeric or elastomeric material to form a good seal. The sealing members 70 are, in use, in direct contact with the pipe exterior. In an alternative embodiment, there may be a gap between the end sealing elements and the exterior of the pipe is, but preferably the gap between the sealing element and the pipe is less than 10 mm.

Figure 12:
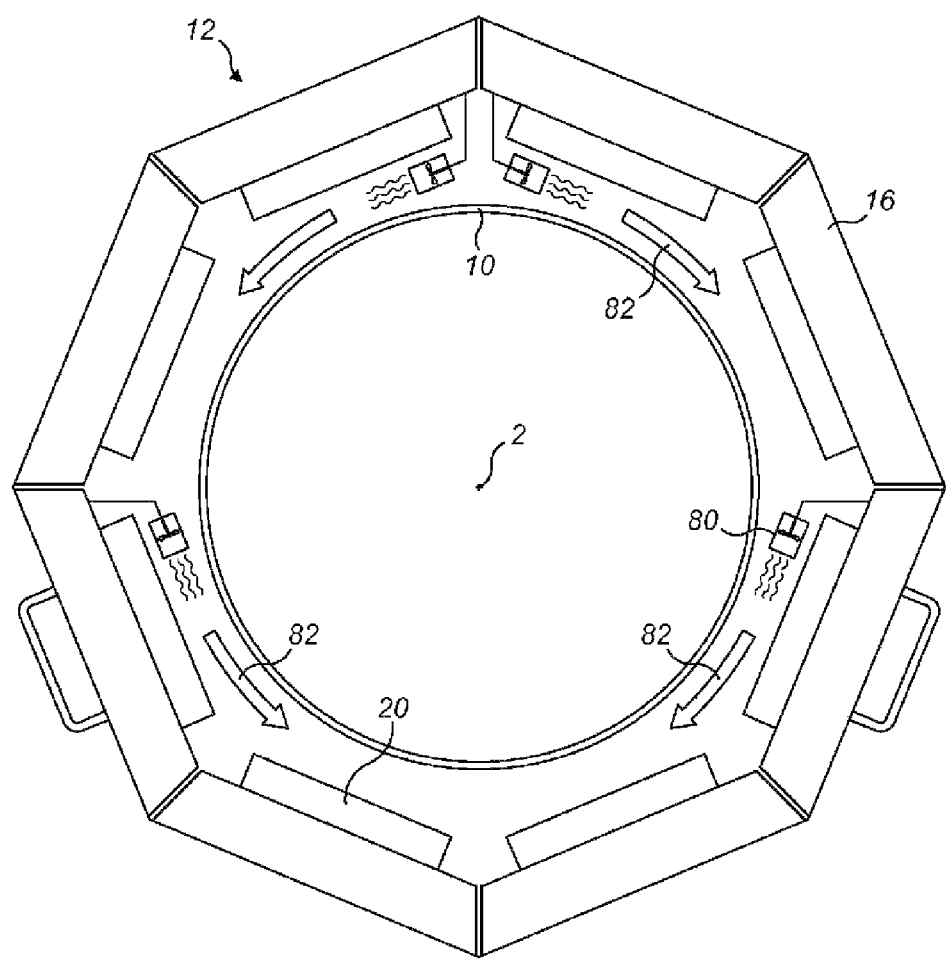
FIG. 12 shows a heat delivery apparatus and an airflow restricting means of a fifth embodiment (for S-lay).

FIG. 12 shows an apparatus 12 comprised two half-shell heating arrays 16 in a closed configuration according to a fifth embodiment. In this fifth embodiment, the apparatus 12 restricts the flow of air within the air space between the pipe 2 (not separately shown, but the central axis of which being indicated in FIG. 12 by the reference numeral 2) and the heater elements 20 by means of providing fans 80 which each generate an airflow in a direction that opposes the direction of airflow that would otherwise be generated by means of the step of applying heat (i.e. the convection currents that would otherwise be caused by rising hot air). Thus the fans are positioned so as to urge air circumferentially around the pipe in a direction (see arrows 82) that is generally downwards and around the pipe. The fans may be operated under the control of the control unit. Thus, control of the fans can depend on the heating of the heater elements and be operated only when there is a significant risk of convection airflows causing undesirable cooling and/or uneven or inefficient heating of the sleeve 10. The fans 80 can thereby counteract the upflow of air resulting from natural convection.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The spatial distribution of, and timing of, the heating effected by the array of heating elements may be varied to suit particular circumstances. All heating elements in the array may, for example, be operated simultaneously for a length of time, possibly at different power outputs, so that the sleeve receives infra-red radiation over substantially its entire surface for the length of heating time, thereby leading to homogenous shrinkage. In such an embodiment, there may therefore be no need for individual control of the heating provided by separate portions/heating devices of the heating apparatus. Indeed, there may be no separately discernible heating devices arranged along the length of the axis.

The fins of the embodiment for S-lay could be provided in the apparatus of the embodiment designed for J-lay. Effectively, each heater element would then be surrounded by fins. Considered alternatively, each heater element would be surrounded by a shroud (defined by walls that could be viewed as fins) that allows transmission of infra-red radiation to the sleeve but which restricts airflow to or from the region within the shroud.

One or more fins may be removably mounted, perhaps allowing for different sized fins to be used for different applications.

Fewer fins may be provided than shown in the Figures, whilst still providing the benefit of the embodiments of the invention.

The circumferentially arranged fins for use in the J-lay mode of pipe-laying could each extend further around the circumference, thereby requiring fewer fins for the same circumferential extent.

The fins could be mounted on struts such that there is a small separation between the base of the fins and the structure that supports the fins and the heater elements.

The apparatus may of course be used with pipes of smaller diameters. The apparatus may be scaled to be suitable for use with pipes of different diameters. The alignment of the apparatus relative to the pipe may be corrected manually. There would in such an arrangement be no need for the provision of light sensors or the like. Such manual movement of the apparatus may still however be guided by the points on the pipe illuminated by the laser light.

The sealing elements of the fourth embodiment could be made of carbon steel.

The fans of the fifth embodiment can be arranged in different positions, for example so that the fans can reduce airflows that would otherwise be caused in heat-shrinking sleeves when laying pipes in a J-lay mode. In such a case, the fans may direct air in a generally downward direction and generally aligned with the axis of the pipe.

Some or all of (a) the fins of the first, second and/or third embodiments, (b) the sealing members of the fourth embodiment and (c) the fans of the fifth embodiment may be combined in a single apparatus.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of heating a heat-shrinkable sleeve around a portion of a pipe during a method of laying a pipeline for the transportation of hydrocarbons, wherein the method of heating comprises:
providing a pipe,
arranging a heat-shrinkable sleeve around a portion of the pipe,
arranging a heat-delivery apparatus around the pipe in a region of the heat-shrinkable sleeve in a heating configuration, the heat-delivery apparatus comprising one or more heater devices which define an interior heating surface that surrounds the heat-shrinkable sleeve, there being an air space defined between the exterior of the heat-shrinkable sleeve and the interior heating surface,
applying heat to the heat-shrinkable sleeve via the one or more heater devices, the step of applying heat comprising applying heat to all regions of the heat-shrinkable sleeve without moving said one or more heater devices relative to the pipe, and
controlling the flow of air within said air space that would otherwise be generated by the step of applying heat, and wherein
said step of controlling the flow of air is performed at least in part by at least one of (a) providing one or more flow restricting members in the air space and (b) actively generating an airflow in the air space.

2. A method according to claim 1, wherein the step of controlling the flow of air is performed at least in part by providing flow restricting members in the air space thereby dividing the air space into separate regions between which the flow of air is restricted.

3. A method according to claim 1, wherein the step of controlling the flow of air is performed at least in part by providing one or more fins to restrict the flow of air from one region in the air space to a different region in the air space.

4. A method according to claim 3, wherein the method comprises forming a shrunk sleeve, wherein each fin has a shape such that a shortest distance between the shrunk sleeve and the fin is less than half of a shortest distance between the shrunk sleeve and the interior heating surface.

5. A method according to claim 1, wherein the step of controlling the flow of air comprises sealing or partially sealing ends of the heat-delivery apparatus thereby restricting the flow of air between within and outside of the air space.

6. A method according to claim 1, wherein the step of controlling the flow of air is performed at least in part by generating an airflow in the air space in a direction that at least partially opposes the direction of airflow that would otherwise be generated by the step of applying heat.

7. A method according to claim 1, wherein the step of arranging the heat-delivery apparatus around the pipe in the region of the sleeve in a heating configuration results in the interior heating surface surrounding and enveloping the heat-shrinkable sleeve for substantially an entire length of the sleeve.

8. A method according to claim 1, wherein the step of applying heat to the heat-shrinkable sleeve comprises controlling the one or more heater devices to deliver different amounts of heat to different regions of the sleeve such that at a given time a first region of the interior heating surface transmits more heat per unit time than a second region of the interior heating surface.

9. A heat-delivery apparatus configured for use as the heat-delivery apparatus of the method of heating a heat-shrinkable sleeve around a portion of a pipe according to claim 1, wherein
the heat-delivery apparatus has an axis alignable to coincide with a longitudinal axis of the portion of the pipe,
the heat-delivery apparatus comprises one or more heater devices so arranged that, in use, (i) an interior heating surface is defined that surrounds the pipe on which the heat-shrinkable sleeve is arranged, there being an air space defined between the exterior of the heat-shrinkable sleeve and the interior heating surface and (ii) heat is applied to all regions of the heat-shrinkable sleeve without moving said one or more heater devices relative to the pipe, and
the heat-delivery apparatus comprises at least one of: (a) one or more flow restricting members in the air space and (b) one or more airflow generators arranged to provide an airflow within the air space, for controlling the flow of air within the air space during heating of the heat-shrinkable sleeve.

10. A heat-delivery apparatus according to claim 9, wherein said heat delivery apparatus comprises the one or more flow restricting members in the air space, and the one or more flow restricting members in the air space comprises one or more fins arranged to restrict the flow of air within the air space during heating of the heat-shrinkable sleeve.

11. A heat-delivery apparatus according to claim 10, wherein at least one of the fins has a length that extends in a generally axial direction.

12. A heat-delivery apparatus according to claim 10, wherein at least one of the fins has a length that extends in a generally circumferential direction.

13. A heat-delivery apparatus according to claim 10, wherein at least one of the fins has a height that extends to a radial position that is more than 50 mm closer to the longitudinal axis than a closest part of the interior heating surface.

14. A heat-delivery apparatus according to claim 10, wherein the interior heating surface is defined by a multiplicity of individual heater elements, and each of two or more fins is positioned between a respective pair of adjacent heater elements.

15. A heat-delivery apparatus according to claim 10, wherein the apparatus additionally comprises a first sealing flange at a first end of the interior heating surface and a second sealing flange at a second, opposite, end of the interior heating surface, the first and second sealing flanges restricting airflow between the air space and a region external to the apparatus.

16. A heat-delivery apparatus according to claim 9, wherein said heat delivery apparatus comprises the one or more airflow generators arranged to provide an airflow within the air space.

17. A heat-delivery apparatus according to claim 16, wherein the one or more airflow generators are located within the air space.

18. A method of heating a heat-shrinkable sleeve around a portion of a pipe during a method of laying a pipeline for the transportation of hydrocarbons, wherein the method comprises:
providing a pipe,
arranging a heat-shrinkable sleeve around a portion of the pipe,
arranging a heat-delivery apparatus around the pipe in a region of the heat-shrinkable sleeve in a heating configuration, the heat-delivery apparatus comprising one or more heater devices which define an interior heating surface that surrounds the heat-shrinkable sleeve, there being an air space defined between the exterior of the heat-shrinkable sleeve and the interior heating surface,
applying heat to all regions of the heat-shrinkable sleeve via the one or more heater devices, without moving said one or more heater devices relative to the pipe, and
providing at least one of (a) one or more flow restricting members in the air space thereby dividing the air space into separate regions between which the flow of air is restricted and (b) one or more airflow generating devices at least partially located within the air space, said at least one of said flow restricting members and said airflow generating devices being arranged to control airflows within the air space to promote better shrinking of the sleeve onto the pipe.

19. A heat-delivery apparatus according to claim 16, wherein the apparatus additionally comprises a first sealing flange at a first end of the interior heating surface and a second sealing flange at a second, opposite, end of the interior heating surface, the first and second sealing flanges restricting airflow between the air space and a region external to the apparatus.

20. A heat-delivery apparatus according to claim 10, wherein said heat delivery apparatus additionally comprises the one or more airflow generators arranged to provide an airflow within the air space.

21. A method according to claim 18, wherein the one or more flow restricting members comprises one or more fins arranged such that the length of each fin extends in a generally axial direction.

22. A method according to claim 1, wherein the step of controlling the flow of air is performed at least in part by generating an airflow with a device that is at least partially located within the air space.

* * * * *